H. H. BONNEY.
LOCK FOR AUTOMOBILES.
APPLICATION FILED SEPT. 28, 1917.

1,266,391. Patented May 14, 1918.

Inventor
H. H. Bonney,
By Victor J. Evans
Attorney

Witness

UNITED STATES PATENT OFFICE.

HAROLD HOBSON BONNEY, OF LOUISVILLE, ILLINOIS.

LOCK FOR AUTOMOBILES.

1,266,391.  Specification of Letters Patent.  Patented May 14, 1918.

Application filed September 28, 1917. Serial No. 193,795.

*To all whom it may concern:*

Be it known that I, HAROLD H. BONNEY, a citizen of the United States, residing at Louisville, in the county of Clay and State of Illinois, have invented new and useful Improvements in Locks for Automobiles, of which the following is a specification.

This invention relates to a lock for an automobile and the object is to provide a device for preventing the operation of the emergency brake of a well known type of car, by any individual other than one authorized to do so, and who is provided with a key for releasing the locking device.

A further object is to provide a device adapted to be secured in position between the main lever of an emergency brake and the release lever thereof and to be retained in position by means of a pad lock or other suitable locking device.

A still further object is to provide a lock member provided with a portion adapted to engage the extreme end of the main lever of the emergency brake and to be mounted within the space between said lever and the release lever, the device being provided with an aperture through which the hasp of a pad lock may be passed for encircling the eye portion of the locking member and the main lever with its connecting rod operated by the release lever.

With the foregoing and other objects in view, the invention consists in the novel construction, combination and arrangement of elements hereinafter described and claimed.

Figure 1:
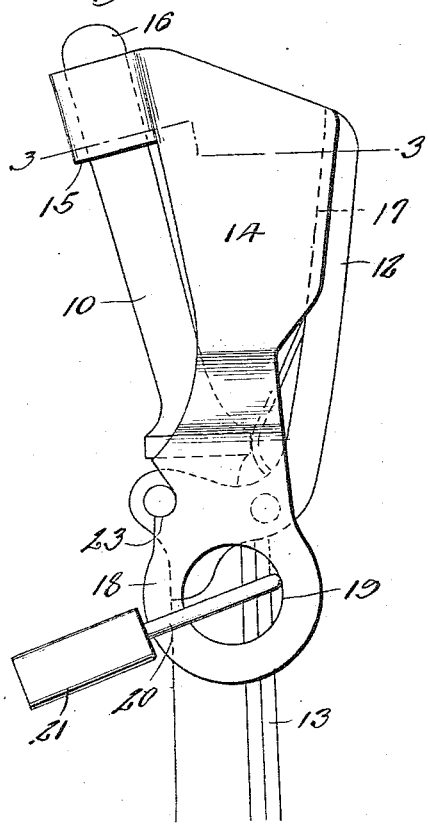
Figure 1 is a view of the device in side elevation and in operative position.
Figure 2:
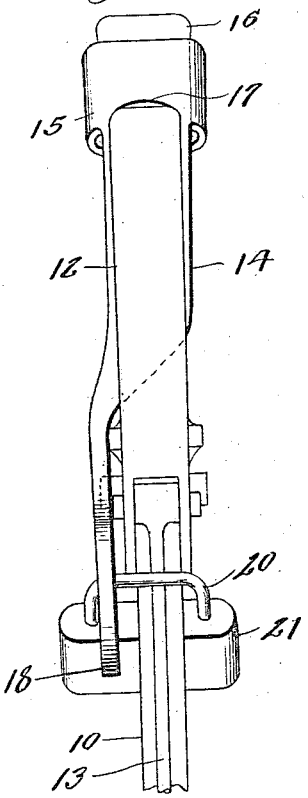
Fig. 2 is an elevation taken from a different angle.
Figure 3:
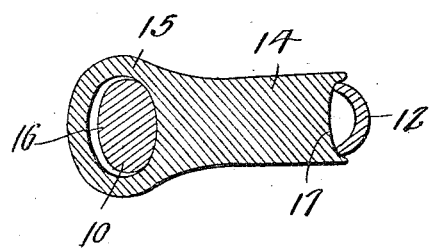
Fig. 3 is a section on the line 3—3 of Fig. 1.

The main lever of an emergency brake of a Ford or other car is designated 10 and the release lever thereof is shown at 12 this lever having connection with a release rod 13, operating in the usual manner. On the type of car mentioned this lever is operated in one direction for applying the emergency brake and in the extreme opposite direction for throwing in the high speed gears. The lever is designed to be locked in the manner herein described when it is in position for applying the brake, or if desired when in central or neutral position.

The body portion of the device 14 includes an apertured portion 15 for engaging the upper end 16 of the lever 10. The body portion is grooved at or near the edge 17, in order that it may be brought into intimate contact with the surface of the release lever 12. The lower portion of the device 14 constitutes an eye member 18 provided with an aperture 19 through which the hasp 20 of a pad lock 21 may be passed. This hasp encircles the brake lever 10 and the release connecting rod 13, the lock thereby retaining the several elements in positive engagement so that it is impossible to operate the release lever 12, and therefore impossible to operate the main lever 10 for starting the car. The side of the body portion 17 may be notched as shown at 23 for accommodation of the mounting means for the release lever.

It will be observed that the device described is most effective in accomplishing the purpose for which it is designed, since the brakes when applied and locked cannot be released and the car cannot even be towed until the lock is disengaged. For the reason indicated the lever cannot be thrown into position for starting the engine.

What is claimed is:

1. In a device of the class described, a body portion provided with means for engaging the main lever of a brake, said body portion including a tapering portion adapted to occupy the space between the main lever and the release lever of the brake and said body portion being provided with a downwardly extending member having an aperture therein, said downwardly extending member engaging the side of the main lever of the brake, and a lock provided with a hasp passing through said aperture and inclosing the main lever of said brake.

2. As an article of manufacture, a lock of the type described comprising an integrally formed member provided with an offset portion at one end having an aperture therein to fit over the end of a brake lever, said member having a groove extending along one edge and adapted to engage a release lever, and said member being also provided with a plate portion offset in a direction at an angle with the offset portion first named for engagement with the sides of said levers, the offset portion having an aperture of a diameter greater than the cross section of the brake lever, and having a notch in one side for engagement with the mounting means of the release lever.

In testimony whereof I affix my signature.

HAROLD HOBSON BONNEY.

Copies of this patent may be obtained for five cents each, by addressing the "Commissioner of Patents, Washington, D. C."